United States Patent
Mori et al.

(10) Patent No.: US 6,773,788 B2
(45) Date of Patent: Aug. 10, 2004

(54) MAGNETIC RECORDING MEDIUM

(75) Inventors: Masahiko Mori, Odawara (JP); Kiyomi Ejiri, Odawara (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 11 days.

(21) Appl. No.: 10/216,849

(22) Filed: Aug. 13, 2002

(65) Prior Publication Data

US 2003/0113585 A1 Jun. 19, 2003

(30) Foreign Application Priority Data

Aug. 14, 2001 (JP) ........................................ 2001-245918

(51) Int. Cl.[7] .............................................. G11B 5/706
(52) U.S. Cl. ........................ 428/141; 428/329; 428/336; 428/694 BH; 428/694 BS; 428/694 BR
(58) Field of Search ................................ 428/141, 329, 428/336, 694 BH, 694 BS, 694 BR

(56) References Cited

U.S. PATENT DOCUMENTS

2003/0113587 A1 * 6/2003 Mori .................. 428/694 BH

FOREIGN PATENT DOCUMENTS

| JP | 2003022515 | * | 1/2003 |
| JP | 2003263716 | * | 9/2003 |

* cited by examiner

*Primary Examiner*—Stevan A. Resan
(74) *Attorney, Agent, or Firm*—Sughrue Mion, PLLC

(57) ABSTRACT

Provided is a magnetic recording medium exhibiting high C/N ratio and suited to high-density magnetic recording, particularly, to reproduction with MR heads. The magnetic recording medium comprises a nonmagnetic powder and a binder and a magnetic layer comprising a ferromagnetic powder and a binder in this order on a flexible nonmagnetic support. The magnetic layer has an average thickness ranging from 0.02 to 0.2 $\mu$m, the ferromagnetic powder contained in the magnetic layer is a plate-shaped hexagonal ferrite ferromagnetic powder having an average plate diameter of 10 to 40 nm, the ratio of a volume of magnetic reversal to a volume of magnetic material particles is equal to or less than 3, the magnetic layer has a coercive force Hc equal to or higher than 159 kA/m, and components magnetically reversing in the magnetic field of 80 kA/m or less are less than 1 percent in the magnetization distribution of the magnetic layer.

13 Claims, No Drawings

MAGNETIC RECORDING MEDIUM

FIELD OF THE INVENTION

The present invention relates to a magnetic recording medium capable of high-density magnetic recording, in particular, suited to reproduction employing an MR head.

BACKGROUND OF THE INVENTION

Recording wavelengths have tended to shorten as recording densities have increased in recent years. The problem of self-demagnetization loss during recording, where a thick recording layer results in low output, has become substantial. For this reason, magnetic layers are made thin. However, when a magnetic layer equal to or less than 2 $\mu$m is directly coated on a support, the nonmagnetic support tends to affect the surface of the magnetic layer, and electromagnetic characteristics and dropout tend to deteriorate.

One way of solving this problem is to employ a simultaneous multilayer coating method to apply a nonmagnetic layer as a lower layer and then apply a thin magnetic coating liquid of high concentration, as described in Japanese Unexamined Patent Publication(KOKAI) Showa Nos. 63-191315 and 63-187418. These methods have permitted marked improvement in yield and made it possible to achieve good electromagnetic characteristics. Magnetoresistive reproduction heads (MR heads) have been practically applied to hard disks to further increase recording density. In flexible media, there are test results for metal evaporation tapes (ME) (IEEE. Trans. Mag. Vol. 35, No. 2, p. 729 (1999)). However, since it is difficult to manufacture magnetic recording media suitable for reproduction with MR heads in particulate magnetic recording with excellent productivity and storage properties, they are not employed in practical.

Taking the above states into consideration, it is an object of the present invention is to provide a magnetic recording medium exhibiting high C/N ratio and suited to high-density magnetic recording, particularly, to reproduction with MR heads.

SUMMARY OF THE INVENTION

The present inventors conducted extensive research focusing on magnetic powders, particularly ferrite magnetic powders, for achieving the above-stated objects. As a result, they discovered a certain relation between the thickness of the magnetic layer and the characteristics of the magnetic powder particles to achieve the present invention.

That is, the object of the present invention is achieved by a magnetic recording medium comprising a nonmagnetic layer comprising a nonmagnetic powder and a binder and a magnetic layer comprising a ferromagnetic powder and a binder in this order on a flexible nonmagnetic support, characterized in that the magnetic layer has an average thickness ranging from 0.02 to 0.2 $\mu$m, the ferromagnetic powder contained in the magnetic layer is a plate-shaped hexagonal ferrite ferromagnetic powder having an average plate diameter of 10 to 40 nm, the ratio of a volume of magnetic reversal to a volume of magnetic material particles is equal to or less than 3, the magnetic layer has a coercive force Hc equal to or higher than 159 kA/m (2,000 Oe), and components magnetically reversing in the magnetic field of 80 kA/m (1,000 Oe) or less are less than 1 percent in the magnetization distribution of the magnetic layer.

The preferred modes of the magnetic recording medium of the present invention are as follows;

(1) The magnetic recording medium in which the 10 $\mu$m Power spectrum Density of Roughness abbreviated to "PSD" is equal to or less than 9,000 nm$^3$ on the magnetic layer surface;

(2) The magnetic recording medium employing an MR head during at least reproduction.

Further, the magnetic recording medium of the present invention is obtained by the following manufacturing method:

A method of manufacturing a magnetic recording medium comprising a step in which a nonmagnetic layer coating liquid comprising a nonmagnetic powder and a binder and, over the nonmagnetic layer, a magnetic layer coating liquid comprising a ferromagnetic powder and a binder are coated on a nonmagnetic flexible support by a wet-on-wet (wet/wet) method, characterized in that the ratio of the viscosity of the magnetic layer coating liquid to the viscosity of the nonmagnetic layer coating liquid is equal to or less than 0.8 at a high shear rate (45,000 s$^{-1}$)

The magnetic recording medium of the present invention is described in detail below.

The magnetic recording medium of the present invention is primarily characterized in that the average thickness of the magnetic layer is 0.02 to 0.2 $\mu$m, the ferromagnetic powder contained in the magnetic layer is plate-shaped hexagonal ferrite ferromagnetic powder with an average plate diameter of 10 to 40 nm, and the ratio of the volume of magnetic reversal to the volume of magnetic particles is equal to or less than 3.

The average thickness of the magnetic layer of the present invention is 0.02 to 0.2 $\mu$m, preferably 0.03 to 0.1 $\mu$m, and more preferably, 0.03 to 0.08 $\mu$m. When the thickness of the magnetic layer is equal to or higher than 0.02 $\mu$m, the magnetic particles in the magnetic layer are able to assume a longitudinal orientation, distributing magnetic material to all areas and yielding good magnetic layer squareness. When the thickness of the magnetic layer is equal to or less than 0.2 $\mu$m, self-demagnetization loss can be inhibited, a low level of magnetization is possible in the magnetic layer, and noise due to saturation can be prevented in MR heads.

Further, the particle size of the ferromagnetic powder contained in the form of the plate-shaped hexagonal ferrite powder in the magnetic layer, defined by the average of the maximum major axis length of the hexagonal plates, that is, the average plate diameter, is 10 to 40 nm, preferably 10 to 35 nm, and more preferably 15 to 35 nm. In reproduction with MR heads, it is necessary to inhibit noise as much as possible. When the average plate diameter ranges from 10 to 40 nm, it is possible to prevent destabilization of magnetization due to thermal fluctuation and noise is also low. Both are suited to high-density magnetic recording.

The ratio of the volume of magnetic reversal to the volume of magnetic particles in the magnetic layer is equal to or less than 3. That is, in the present invention, based on the average particle volume of the plate-shaped hexagonal ferrite ferromagnetic powder, the ferromagnetic powder is dispersed in the binder so that the volume of magnetic reversal is within three times the average particle volume, preferably within 1.7 times, and more preferably, within 1.2 times.

The volume of magnetic reversal V can be obtained from the following relational equation between coercive force Hc due to thermal fluctuation and the volume of magnetic reversal, V.

$$Hc=(2K/Ms)\{1-[(kT/KV)ln(At/0.693)]^{1/2}\}$$

Here, K denotes the constant of anisotropy, Ms denotes saturation magnetization, k denotes the Boltzmann constant, T denotes absolute temperature, V denotes the volume of magnetic reversal, A denotes the spin precession frequency, and t denotes the magnetic field reversal time.

Since the ratio of the volume of magnetic reversal to the volume of magnetic particles exceeds 3 in the magnetic powder conventionally employed in the magnetic layers of magnetic recording media, noise during reproduction with MR heads is high and a high C/N ratio cannot be achieved. This is thought to occur due to magnetic coupling of multiple plate-shaped hexagonal ferrite particles as the result of stacking between plate-shaped hexagonal ferrite magnetic particles, resulting in a high volume of magnetic reversal in the magnetic material.

The present inventors have extensively examined ways of achieving a ratio of the volume of magnetic reversal equal to or less than 3 to the volume of magnetic particles, that is, reducing the volume of magnetic reversal by inhibiting stacking between plate-shaped hexagonal ferrite magnetic particles as much as possible.

In the particulate magnetic recording medium, as set forth above, a simultaneous multilayer coating method is employed to coat a high-concentration magnetic layer coating liquid on a nonmagnetic layer to achieve a thin magnetic layer. However, with this thinning of the magnetic layer, problems of the above-mentioned stacking and roughening of the magnetic layer surface have conventionally come. The present inventors attributed this phenomenon to a reduction in shearing energy per unit volume applied to the magnetic layer during simultaneous multilayer coating, causing reduced break down of aggregation of plate-shaped hexagonal ferrite magnetic particles in the magnetic layer and reduced inhibition effect of stacking. Accordingly, they conducted extensive research based on the inference that this phenomenon could be inhibited by increasing the shearing energy per unit volume applied to a thin magnetic layer. As a result, they discovered that when the magnetic recording medium was manufactured by a wet-on-wet (wet/wet) method and the ratio of the viscosity of the magnetic layer coating liquid to the viscosity of the nonmagnetic layer coating liquid was limited to equal to or less than 0.8 at a high shearing rate ($45,000 \text{ s}^{-1}$), it became possible to manufacture a magnetic recording medium with little stacking mentioned above and a smoothened magnetic layer surface.

Since the shearing energy per unit volume applied to the magnetic layer is inversely proportional to the viscosity ratio of the coating liquids, it is desirable to lower the viscosity ratio. When the ratio of the viscosity of the magnetic layer coating liquid to the viscosity of the nonmagnetic layer coating liquid at a high shearing rate ($45,000 \text{ s}^{-1}$) is limited to equal to or less than 0.8, adequate shearing energy can be achieved to smooth out the magnetic layer surface and break down stacking.

The following methods are preferred modes of limiting the ratio of the volume of the magnetic reversal to the volume of the magnetic material particles to equal to or less than 3:

(1) Maintaining a yield stress in the nonmagnetic layer (lower layer) coating liquid equal to or higher than 1 Pa (10 dyn/cm$^2$), preferably equal to or higher than 1.4 Pa (14 dyn/cm$^2$). Specific means of achieving this include, for example, the use of a solvent (for example, cyclohexanone or THF) in which the molecular chains of the binder tend to readily spread (high solubility). When a magnetic layer in which microgranular magnetic particles are employed is made thin, nonmagnetic powder migrates to the magnetic layer surface during coating and drying, pushing back the magnetic particles and entering the magnetic layer. In this process, the magnetic particles undergo re-aggregation. Accordingly, it is effective that the resistance against the migration of the nonmagnetic powder is increased by designing the nonmagnetic layer coating liquid mentioned above.

(2) Increasing the solid component concentration of the magnetic layer coating liquid to a level greater than that of the nonmagnetic layer coating liquid. When the solid component concentration of the magnetic layer coating liquid is increased, the gaps between solids generated by drying of the solvent during drying of the coatings decrease, inhibiting migration of the nonmagnetic powder into the magnetic layer. However, when the concentration of solid components in the magnetic layer coating liquid is increased, the above-described viscosity ratio increases. Therefore, it is desirable that the solid component concentration is increased within the range where the above-stated viscosity ratio is satisfied.

The second characteristic of the magnetic recording medium of the present invention are that the coercive force Hc of the magnetic layer is equal to or higher than 159 kA/m (2,000 Oe) and components magnetically reversing in the magnetic field of 80 kA/m (1,000 Oe) or less are less than 1 percent in the magnetization distribution of the magnetic layer.

The coercive force Hc in the magnetic layer of the present invention is equal to or higher than 159 kA/m (2,000 Oe), preferably 159 to 400 kA (2,000 to 5,000 Oe). When the coercive force Hc of the magnetic layer is equal to or higher than 159 kA/m, adequate output can be achieved and high densities are possible.

In the magnetic layer of the present invention, components magnetically reversing in the magnetic field of 80 kA/m (1,000 Oe) or less are less than 1 percent, preferably equal to or less than 0.7 percent, more preferably equal to or less than 0.5 percent in the magnetization distribution.

In the magnetization distribution of the magnetic layer, the components magnetically reversing in the magnetic field of 80 kA/m (1,999 Oe) or less essentially do not contribute to recording or reproduction. However, when a large amount of such components are present in the magnetic layer, noise has been found to be high even when the ratio of the volume of magnetic reversal to the volume of magnetic particles, which is the index of the degree of average stacking of the plate-shaped hexagonal ferrite ferromagnetic powder (BaFe particles) in the magnetic layer, is reduced. Accordingly, to reduce noise during reproduction with MR heads and achieve a high C/N ratio, components magnetically reversing in the magnetic field of 80 kA/m (1,000 Oe) or less are limited to less than 1 percent in the magnetization distribution of the magnetic layer.

To limit the above-mentioned components magnetically reversing in the magnetic field of 80 kA/m (1,000 Oe) or less to less than 1 percent, it is desirable that the ratio of particles present having a plate diameter is equal to or less than 10 nm. In the present invention, it is possible to limit the components magnetically reversing to less than 1 percent by dissolving hexagonal ferrite ferromagnetic powder (BaFe particles) in an acid solution such as acetic acid and removing the free component by centrifugal separation to limit the ratio of particles present having a plate diameter equal to or less than 10 nm relative to the whole plate-shaped hexagonal ferrite ferromagnetic powder to equal to or less than 10 percent.

[Magnetic Layer]
1. Ferromagnetic Powder

The ferromagnetic powder in the magnetic layer of the present invention is a plate-shaped hexagonal ferrite. Plate-shaped hexagonal ferrite has a high coercive force (Hc), chemical stability, resistance to corrosion, and good resistance to friction due to high hardness. It thus fills the requirements for reducing the magnetic spacing accompanying high densification, and can be expected to yield thin layers, high C/N ratios, and good resolution. Examples of plate-shaped hexagonal ferrite are barium ferrite, strontium ferrite, lead ferrite, calcium ferrite, and various substitution products thereof, and Co substitution products. Specific examples are magnetoplumbite-type barium ferrite and strontium ferrite; magnetoplumbite-type ferrite in which the particle surfaces are covered with spinels; and magnetoplumbite-type barium ferrite, strontium ferrite, and the like partly comprising a spinel phase. The following may be incorporated in addition to the prescribed atoms: Al, Si, S, Nb, Sn, Ti, V, Cr, Cu, Y, Mo, Rh, Pd, Ag, Sn, Sb, Te, W, Re, Au, Bi, La, Ce, Pr, Nd, P, Co, Mn, Zn, Ni, B, Ge, Nb and the like. Compounds to which elements such as Co—Zn, Co—Ti, Co—Ti—Zr, Co—Ti—Zn, Ni—Ti—Zn, Nb—Zn—Co, Sn—Zn—Co, Sn—Co—Ti and Nb—Zn have been added may generally also be employed. They may comprise specific impurities depending on the starting materials and manufacturing methods.

The plate thickness of the plate-shaped hexagonal ferrite powder can be 5 to 20 nm, preferably 8 to 15 nm. The plate ratio (plate diameter/plate thickness) is preferably 2 to 15, more preferably 3 to 8. If the plate ratio is 2 to 15, it is possible to achieve adequate orientation properties while maintaining a high filling property, as well as to achieve low noise because the effect of stacking between particles is small. In addition, narrow distributions of particle plate diameter and plate thickness are normally preferred. Although difficult to render the distributions of particle plate diameter and plate thickness in number form, 500 particles can be randomly measured in a TEM photograph of particles to make a comparison. The distributions are often not a normal distribution. However, when expressed as the standard deviation to the average size, σ/average size=0.1 to 2.0. The particle producing reaction system is rendered as uniform as possible and the particles produced are subjected to a distribution-enhancing treatment to achieve a sharp particle size distribution. For example, methods such as selectively dissolving ultrafine particles in an acid solution by dissolution are known.

The average particle volume of plate-shaped hexagonal ferrite ferromagnetic powder is 1,500 to 15,000 $nm^3$, preferably 2,000 to 12,000 $nm^3$, and more preferably, 3,000 to 10,000 $nm^3$. When the average particle volume is 1,500 to 15,000 $nm^3$, the thermal stability of recording magnetization is not compromised and noise can be inhibited, thereby yielding an adequate C/N ratio. Further, the volume fill rate is desirably equal to or higher than 30 percent, preferably equal to or higher than 35 percent, and more preferably, equal to or higher than 38 percent.

The above-mentioned plate-shaped hexagonal ferrite ferromagnetic powder normally has a specific surface area by BET method of 10 to 100 $m^2/g$, preferably 50 to 80 $m^2/g$, almost corresponding to an arithmetic value from the particle plate diameter and the plate thickness. The range of 10 to 100 $m^2/g$ is preferred because noise is reduced and smooth surface is easily achieved. The coercive force Hc measured in the magnetic powder can be made about 40 to 400 kA/m. Although a high coercive force Hc is advantageous to high-density recording, it is limited to 119 to 397 kA/m, preferably 159 to 320 kA/m taking the capacity of the recording head into consideration. If the saturation magnetization σs of the head exceeds 1.4 T, 175 kA/m or more is preferred. The coercive force Hc can be controlled through the particle size (plate diameter, plate thickness), the type and quantity of elements contained, the substitution site of elements, and the conditions under which the particle generating reaction is conducted. Saturation magnetization σs is preferably 50 to 70 A·$m^2$/kg (50 to 70 emu/g) because it tends to decrease the smaller the particles become.

When dispersing the plate-shaped hexagonal ferrite ferromagnetic powder, the surface of the ferromagnetic material particles can be processed with a substance suited to a dispersion medium and a polymer. Both organic and inorganic compounds can be employed as surface treatment agents. Examples of the principal compounds are oxides and hydroxides of Si, Al, P, and the like; various silane coupling agents; and various titanium coupling agents. The quantity ranges from 0.1 to 10 mass percent relative to the magnetic material. The pH of the magnetic material is also important to dispersion. A pH of about 4 to 12 is usually optimum for the dispersion medium and polymer. From the perspective of the chemical stability and storage properties of the medium, a pH of about 6 to 11 can be selected. Moisture contained in the magnetic material also affects dispersion. There is an optimum level for the dispersion medium and polymer, usually selected from the range of 0.1 to 2.0 mass percent.

Methods of manufacturing the plate-shaped hexagonal ferrite include: (1) a vitrified crystallization method consisting of mixing into a desired ferrite composition barium carbonate, iron oxide, and a metal oxide substituting for iron with a glass forming substance such as boron oxide; melting the mixture; rapidly cooling the mixture to obtain an amorphous material; reheating the amorphous material; and refining and comminuting the product to obtain a barium ferrite crystal powder; (2) a hydrothermal reaction method consisting of neutralizing a barium ferrite composition metal salt solution with an alkali; removing the by-product; heating the liquid phase to 100° C. or greater; and washing, drying, and comminuting the product to obtain barium ferrite crystal powder; and (3) a coprecipitation method consisting of neutralizing a barium ferrite composition metal salt solution with an alkali; removing the by-product; drying the product and processing it at equal to or less than 1,100° C.; and comminuting the product to obtain barium ferrite crystal powder. However, any manufacturing method can be selected in the present invention.

2. Binder

Conventionally known thermoplastic resins, thermosetting resins, reactive resins, electron beam-curing resins, ultraviolet curing resins, visible light curing resins and mixtures thereof may be employed as binders employed in the magnetic layer in the present invention. For example, binders described in Japanese Patent Nos. 2,566,096 and 2,571,351 can be employed.

The thermoplastic resins having a glass transition temperature of −100 to 150° C., a number average molecular weight of 10,000 to 100,000, preferably 20,000 to 60,000, and the degree of polymerization of about 50 to 2,000, preferably about 200 to 600 can be employed.

Examples of such thermoplastic resins are vinyl chloride—vinyl acetate copolymers, vinyl chloride polymer, vinyl chloride—vinyl acetate vinyl alcohol copolymers, vinyl chloride—vinylidene chloride copolymers, vinyl chloride—acrylonitrile copolymers, acrylic ester— acrylonitrile copolymers, acrylic ester—vinylidene chloride copolymers, acrylic ester—styrene copolymers, methacrylic ester—acrylonitrile copolymers, methacrylic ester—vinylidene chloride copolymer, methacrylic ester—styrene copolymer, urethane elastomers, nylon—silicone resins, nitrocellulose—polyamide resins, polyvinyl fluoride, vinylidene chloride—acrylonitrile copolymers, butadiene—acrylonitrile copolymers, polyamide resins, polyvinyl butyral, cellulose derivatives (such as cellulose acetate butyrate, cellulose diacetate, cellulose triacetate, cellulose propionate, nitrocellulose, ethyl cellulose, methyl cellulose, propyl cellulose, methyl ethyl cellulose, carboxymethyl cellulose, and acetyl cellulose), styrene butadiene copolymers, polyester resins, polycarbonate resins, chlorovinylether-acrylic ester copolymers, amino resins, various synthetic rubber thermoplastic resins, and mixtures of the same.

These resins are described in detail in the *Handbook of Plastics* published by Asakura Shoten. Known electron-beam curing resins can be employed in the individual layers. These examples and methods of manufacturing them are described in detail in Japanese Unexamined Patent Publication (KOKAI) Showa No. 62-256219. The above-described resins may be employed singly or in combination. The preferred resin is a combination of polyurethane resin and one or more selected from among vinyl chloride resin, vinyl chloride vinyl acetate copolymer, vinyl chloride vinyl acetate vinyl alcohol copolymer, and vinyl chloride vinyl acetate maleic anhydride copolymer; or a resin obtained by mixing polyisocyanate into one of the above.

Thermosetting and reactive resins with mass average molecular weights in coating liquid of 200,000 or less are desirable. Of these resins, those that do not soften or melt prior to thermal decomposition are preferred. Specific examples are: phenol resins, phenoxy resins, epoxy resins, polyurethane resins, polyester resins, polyurethane polycarbonate resins, urea resins, melamine resins, alkyd resins, silicon resins, acrylic reactive resins (electron-beam curing resins), epoxy-polyamide resins, nitrocellulose melamine resins, mixtures of high molecular weight polyester resins and isocyanate prepolymers, mixtures of methacrylate copolymers and diisocyanate prepolymers, mixtures of polyester polyol and polyisocyanate, urea formaldehyde resin, mixtures of low molecular weight glycol/high molecular weight diol/triphenyl methane trilsocyanate, polyamine resins, polyimine resins, and mixtures thereof.

In addition to the main functional group, the above-listed thermoplastic resins, thermo-setting resins, and reactive resins may comprise such functional groups as carboxylic acid (COOM), sulfinic acid ($SO_2M$), sulfenic acid (SOM), sulfonic acid ($SO_3M$), phosphoric acid ($PO(OM)_2$), phosphonic acid ($PO_3M$), sulfuric acid ($OSO_3M$), and acid groups of ester groups thereof (where M denotes H, an alkali metal, an alkaline earth metal, or a hydrocarbon group); amino acids, aminosulfonic acids, aminoalcohol sulfuric and phosphoric esters, and alkylbetaine and other amphoteric groups; and amino, imino, imido, amido, hydroxyl, alkoxyl, thiol, alkylthio, halogen (F, Cl, Br, I), silyl, siloxane, epoxy, isocyanate, cyano, nitrilo, oxo, acryl, and phosphine groups. Normally, 1 to 6 of these functional groups are contained, each functional group being desirably incorporated in a $1 \times 10^{-6}$ to $1 \times 10^{-2}$ equivalent per gram of resin.

Specific examples of the binders employed in the magnetic layer are VAGH, VYHH, VMCH, VAGF, VAGD, VROH, VYES, VYNC, VMCC, XYHL, XYSG, PKHH, PKHJ, PKHC, and PKFE from Union Carbide Corporation; MPR-TA, MPR-TA5, MPR-TAL, MPR-TSN, MPR-TMF, MPR-TS, MPR-TM, and MPR-TAO from Nisshin Kagaku Kogyo K. K.; 1000W, DX80, DX81, DX82, DX83, and 100FD from Denki Kagaku Kogyo K. K.; MR-104, MR-105, MR110, MR100, MR555, and 400X-110A from Nippon Zeon Co., Ltd.; Nippollan N2301, N2302, and N2304 from Nippon Polyurethane Co., Ltd.; Pandex T-5105, T-R3080, T-5201, Burnock D-400, D-210-80, Crisvon 6109, and 7209 from Dainippon Ink and Chemicals Incorporated.; Vylon UR8200, UR8300, UR-8700, RV530, and RV280 from Toyobo Co., Ltd.; Daipheramine 4020, 5020, 5100, 5300, 9020, 9022, and 7020 from Dainichiseika Color & Chemicals Mfg. Co., Ltd.; MX5004 from Mitsubishi Chemical Corporation; Sanprene SP-150 from Sanyo Chemical Industries, Ltd.; and Saran F310 and F210 from Asahi Chemical Industry Co., Ltd.

The quantity of binder added to the magnetic layer ranges from 5 to 25 mass parts, preferably from 5 to 20 mass parts, more preferably 5 to 15 mass parts, relative to 100 mass parts of the magnetic powder. When employing vinyl chloride resin, the quantity of binder added is preferably from 5 to 30 mass parts; when employing polyurethane resin, from 2 to 20 mass parts; and when employing polyisocyanate, from 2 to 20 mass parts. They may be employed in combination. However, for example, when head corrosion occurs due to the release of trace amounts of chlorine, polyurethane alone or just polyurethane and isocyanate may be employed. When polyurethane is employed in the present invention, the glass transition temperature Tg ranges from −50 to 150° C., preferably from 0 to 100° C.; the elongation at break desirably ranges from 100 to 2,000 percent; the stress at break desirably ranges from 0.49 to 98 MPa (0.05 to 10 $kg/mm^2$); and the yield point desirably ranges from 0.49 to 98 MPa (0.05 to 10 $kg/mm^2$).

The magnetic recording medium of the present invention comprises a nonmagnetic layer between the nonmagnetic support and the magnetic layer. Accordingly, the quantity of binder; the quantity of vinyl chloride resin, polyurethane resin, polyisocyanate, or some other resin in the binder; the molecular weight of each of the resins forming the magnetic layer; the quantity of polar groups; or the physical characteristics or the like of the above-described resins can naturally be different in the nonmagnetic layer and the magnetic layer as required. These should be optimized in each layer. Known techniques for a multilayered magnetic layer may be applied. For example, when the quantity of binder is different in each layer, increasing the quantity of binder in the magnetic layer effectively decreases scratching on the surface of the magnetic layer. To achieve good head touch, the quantity of binder in the nonmagnetic layer can be increased to impart flexibility.

Examples of polyisocyanates suitable for use in the present invention are tolylene dilsocyanate, 4,4'-diphenylmethane diusocyanate, hexamethylene diisocyanate, xylylene diusocyanate, naphthylene-1,5-dilsocyanate, o-toluidine diusocyanate, isophorone diusocyanate, triphenylmethane trilsocyanate, and other isocyanates; products of these isocyanates and polyalcohols; polyisocyanates produced by condensation of isocyanates; and the like. These isocyanates are commercially available under the following trade names, for example: Coronate L, Coronate HL, Coronate 2030, Coronate 2031, Millionate MR and Millionate MTL manufactured by Nippon Polyurethane Industry Co. Ltd.; Takenate D-102, Takenate D-110N, Takenate D-200 and Takenate D-202 manufactured by Takeda Chemical Industries Co. Ltd.; and Desmodule L, Desmodule IL, Desmodule N and Desmodule HL manufactured by Sumitomo Bayer Co. Ltd. They can be used singly or in combinations of two or more in each of layers by exploiting differences in curing reactivity.

3. Additives

Additives can be added to the magnetic layer in the present invention as needed. Examples of additives include carbon black, abrasives, lubricants, dispersing agents, dispersing assistants, anti-mold agents, antistatic agents, anti-oxidation agents, solvents and the like.

<Carbon Black>

Carbon black can be added to the magnetic layer of the present invention, also added to the nonmagnetic layer as needed. Examples of carbon black suitable for use are furnace black for rubber, thermal for rubber, black for coloring, and acetylene black. It is suitable for carbon black to have a specific surface area of 5 to 500 $m^2/g$, a DBP oil absorption capacity of 10 to 400 ml/100 g, a particle diameter of 5 to 300 nm (5 to 300 m $\mu$), a pH of 2 to 10, a moisture content of 0.1 to 10 mass percent, and a tap density of 0.1 to 1 g/ml.

Specific examples of types of carbon black employed in the present invention are: BLACK PEARLS 2000, 1300, 1000, 900, 800, 700 and VULCAN XC-72 from Cabot Corporation; #80, #60, #55, #50 and #35 manufactured by Asahi Carbon Co., Ltd.; #2400B, #2300, #900, #1000, #30, #40 and #10B from Mitsubishi Chemical Corporation; and CONDUCTEX SC, RAVEN 150, 50, 40, and 15 from Columbia Carbon Co., Ltd. The carbon black employed may be surface-treated with a dispersant or grafted with resin, or have a partially graphite-treated surface. The carbon black may be dispersed in advance into the binder prior to addition to the magnetic coating material. These carbon blacks may be used singly or in combination. When employing carbon black, the quantity preferably ranges from 0.1 to 30 mass percent with respect to the mass of the ferromagnetic material.

In the magnetic layer, carbon black works to prevent static, reduce the coefficient of friction, impart light-blocking properties, enhance film strength, and the like; the properties vary with the type of carbon black employed. Accordingly, the type, quantity, and combination of carbon blacks employed in the magnetic layer may be determined separately for the magnetic layer for information recording, magnetic layer for servo signal recording and nonmagnetic layer based on the objective and the various characteristics stated above, such as particle size, oil absorption capacity, electrical conductivity, and pH, and be optimized for each layer.

For example, the *Carbon Black Handbook* compiled by the Carbon Black Association may be consulted for types of carbon black suitable for use in the present invention.

<Abrasives>

Abrasives can be added to the magnetic layer of the present invention, also added to the nonmagnetic layer as needed.

Known materials, chiefly with a Mohs' hardness equal to or higher than 6, such as α-alumina having an α-conversion rate equal to or higher than 90 percent, β-alumina, silicon carbide, chromium oxide, cerium oxide, α-iron oxide, corundum, artificial diamond, silicon nitride, titanium carbide, titanium oxide, silicon dioxide, and boron nitride, may be used singly or in combination as abrasives. Further, a composite comprising two or more of these abrasives (an abrasive obtained by surface-treating one abrasive with another) may also be used. Although these abrasives may contain compounds and elements other than the main component or element in some cases, there is no change in effect so long as the main component constitutes equal to or higher than 90 mass percent. The particle size of these abrasives is desirably equal to or higher than ⅓ and equal to or less than 5 times the thickness of the magnetic layer in wet-on-wet coating and desirably equal to or higher than ⅓ and equal to or less than 2 times the thickness of the magnetic layer in wet-on-dry coating. However, as required, abrasives of differing particle size may be combined or the particle size distribution of a single abrasive may be broadened to achieve the same effect. A large abrasive particle size causes noise and dropout. Particularly in wet-on-dry coating, since the abrasive tends to produce protrusions in the magnetic layer, the use of a microgranular abrasive is preferred. A tap density of 0.3 to 2 g/mL, a moisture content of 0.1 to 5 mass percent, a pH of 2 to 11, and a specific surface area of 1 to 30 $m^2/g$ are desirable. The abrasive may be any of acicular, spherical, or cubic in shape, but shapes that are partially angular have good abrasion properties and are thus preferred.

Specific examples of abrasives are: AKP-20, AKP-30, AKP-50, HIT-55, HIT-60A, HIT-70 and HIT-100 from Sumitomo Chemical Co., Ltd.; G5, G7, S-1 from Nippon Chemical Industrial Co., Ltd.; and TF100 and TF-140 from Toda Kogyo Corp. The type, quantity, and combination of abrasives may be varied in the magnetic layer and nonmagnetic layer, with different abrasives being employed for different purposes. These abrasives may be added to the magnetic coating material after having been predispersed in binder. 5 particles or more of abrasives is preferably present per 100 $\mu m^2$ on the magnetic layer surface and the edge surface of the magnetic layer of the magnetic recording tape of the present invention.

<Lubricants>

Examples of powdered lubricants suitable for use in the magnetic layer of the present invention are inorganic powders such as graphite, molybdenum disulfide, boron nitride, graphite fluoride, calcium carbonate, barium sulfate, silicon oxide, titanium oxide, zinc oxide, tin oxide, and tungsten disulfide; and resin powders such as acryl styrene resin powder, benzoguanamine resin powder, melamine resin powder, polyolefin resin powder, polyester resin powder, polyamide resin powder, polyimide resin powder, and polyethylene fluoride resin powder.

Examples of organic compound lubricants are: compounds incorporating fluorine or silicon such as silicone oils (dialkyl polysiloxane, dialkoxy polysiloxane, phenyl polysiloxane, fluoroalkyl polysiloxane (KF96 and KF 69 manufactured by Shin-Etsu Chemical Co., Ltd. and the like)), fatty acid-modified silicone oils, fluoroalcohols, polyolefins (polyethylene waxes, polypropylene, and the like), polyglycols (ethylene glycol, polyethylene oxide wax, and the like), tetrafluoroethyleneoxide wax, polytetrafluoroglycol, perfluoroalkylether, perfluorofatty acids, perfluorofatty acid esters, perfluoroalkyl sulfuric acid esters, perfluoroalkyl sulfonic acid esters, perfluoroalkyl-benzene sulfonic acid esters and perfluoroalkyl phosphoric acid esters, organic acid and organic acid ester compounds such as alkyl sulfuric acid esters, alkyl sulfonic acid esters, alkyl phosphonic acid triesters, alkyl phosphonic acid monoesters, alkyl phosphonic acid diesters, alkyl phosphoric acid esters and succinic acid esters, nitrogen and sulfur-comprising heterocyclic compounds such as triazaindolizine, tetraazaindene, benztriazole, benzdiazole and EDTA, fatty acid esters comprising a monobasic fatty acid having 10 to 40 carbon atoms and one or more monohydric alcohols, dihydric alcohols, trihydric alcohols, tetrahydric alcohols, or hexahydric alcohols having 2 to 40 carbon atoms, fatty acid esters comprising a monobasic fatty acid having ten or more carbon atoms and a monohydric to hexahydric alcohol having a total number of carbon atoms including those of the monobasic fatty acid of 11 to 70, a fatty acid amide or fatty acid having 8 to 40 carbon atoms, a fatty acid alkylamide, or an aliphatic alcohol.

Specific examples of these compounds are: butyl caprylate, octyl caprylate, ethyl laurate, butyl laurate, octyl laurate, ethyl myristate, butyl myristate, octyl myristate, 2-ethylhexyl myristate, ethyl palmitate, butyl palmitate, octyl palmitate, 2-ethylhexyl palmitate, ethyl stearate, butyl stearate, isobutyl stearate, octyl stearate, 2-ethylhexyl stearate, amyl stearate, isoamyl stearate, 2-ethylpentyl stearate, 2-hexyldexyl stearate, isotridecyl stearate, amide stearate, alkylamide stearate, butoxyethyl stearate, anhydrosorbitan monostearate, anhydrosorbitan distearate, anhydrosorbitan tristearate, anhydrosorbitan tetrastearate, oleyl oleate, oleyl alcohol, lauryl alcohol, montan wax, and carnauba wax. They may be employed singly or in combination.

One or a combination of two or more lubricant additives may also be employed in the present invention; there are also antioxidation agents known as rust-preventing agents (alkylphenol, benzotriazine, tetraazaindene, sulfamides, guanidine, nucleic acids, pyridine, amines, hydroquinones, EDTA, and other metal chelating agents), rust-stopping agents (naphthenic acid, alkenyl succinate, phosphoric acid, dilauryl phosphate, and the like), oil agents (rapeseed oil, lauryl alcohol, and the like), extreme pressure agents (dibenzylsulfide, tricresyl phosphate, tributyl phosphite, and the like), cleaning and dispersing agents, viscosity index increasing agents, fluidity decreasing agents, antifoaming agents, and the like. These lubricants are added in a range of 0.01 to 30 mass parts per 100 mass parts of binder.

Examples of the trade names of lubricants suitable for use in the present invention are: NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, hydrogenated castor oil fatty acid, NAA-42, NAA-44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion 0-2, Nonion LP-20R, Nonion PP-40R, Nonion SP-60R, Nonion OP-80R, Nonion OP-85R, Nonion LT-221, Nonion ST-221, Nonion OT-221, Monogly MB, Nonion DS-60, Anon BF, Anon LG, butyl stearate, butyl laurate, and erucic acid manufactured by NOF Corporation.; oleic acid manufactured Kanto Chemical Co. Ltd; FAL-205 and FAL-123 manufactured by Takemoto Oil & Fat Co., Ltd.; NJLUB LO, NJLUB IPM, and Sansosyzer E4030 manufactured by New Japan Chemical Co. Ltd.; TA-3, KF-96, KF-96L, KF96H, KF410, KF420, KF965, KF54, KF50, KF56, KF907, KF851, X-22-819, X-22-822, KF905, KF700, KF393, KF-857, KF-860, KF-865, X-22-980, KF-101, KF-102, KF-103, X-22-3710, X-22-3715, KF-910 and KF-3935 manufactured by Shin-Etsu Chemical Co. Ltd.; Armide P, Armide C and Armoslip CP manufactured by Lion Armour Co., Ltd.; Duomine TDO manufactured by Lion Corporation; BA-41G manufactured by Nisshin Oil Mills, Ltd.; Profan 2012E, Newpole PE61, Ionet MS-400, Ionet MO-200, Ionet DL-200, Ionet DS-300, Ionet DS-1000 and Ionet DO-200 manufactured by Sanyo Chemical Industries, Ltd.

<Dispersing Agents and Dispersing Assistants>

Examples of dispersing agents and dispersing assistants suitable for use in the present invention are: fatty acids having 2 to 40 carbon atoms such as caprylic acid, capric acid, lauric acid, myristic acid, palmitic acid, stearic acid, oleic acid, elaidic acid, linolic acid, linolenic acid, stearolic acid, behenic acid, maleic acid, and phthalic acid ($R^1COOH$, where $R^1$ denotes an alkyl group, phenyl groups, or aralkyl group having 1 to 39 carbon atoms); metallic soaps comprising alkali metal (Li, Na, K, or the like) salts or alkaline earth metal (Mg, Ca, Ba, or the like) salts of the above-listed fatty acids, $NH_4^+$, Cu, Pb, or the like (copper oleate); fatty acid amides; and lecithin (soybean oil lecithin). Further compounds suitable for use are higher alcohols (butanol, octyl alcohol, myristyl alcohol, stearyl alcohol) having 4 to 40 carbon atoms; sulfuric acid esters of the same; sulfonic acid; phenyl sulfonate; alkyl sulfonate; sulfonic acid ester; phosphoric acid monoester; phosphoric acid diester; phosphoric acid triester; alkyl phosphonate; phenyl phosphonate; and amine products. Further, polyethylene glycol, polyethylene oxide, sulfosuccinic acid, sulfosuccinic acid metal salts, sulfosuccinic acid esters, and the like may also be employed. These dispersing agents are usually employed singly or in combination. A single dispersing agent can be added in a proportion of 0.005 to 20 mass parts per 100 mass parts of binder. These dispersing agents may be precoated on the surface of the ferromagnetic powder or nonmagnetic powder or added during dispersion. The specific details are described, for example, in Japanese Examined Patent Publication (KOKOKU) Showa Nos. 39-28369, 44-17945, and 48-15001, as well as U.S. Pat. Nos. 3,387,993 and 3,470,021.

<Other Additives>

In the present invention, an anti-mold agent may be employed in the form of 2-(4-thiazolyl)benzimidazole, N-(fluorodichloromethylthio)phthalimide, 10,10'-oxybisphenoxarsine, 2,4,5,6-tetrachloroisophthalonitrile, P-tolyldiiodomethylsulfone, triiodoallylalcohol, dihydroacetoacetic acid, mercury phenyloleate, bis(tributyltin)oxide, salicylanilide, and the like. Anti-mold agents are described, for example, in "Microorganism Harm and Prevention Techniques," 1972, Kogaku Tosho, and "Chemistry and Industry", 32, 904 (1979).

In the present invention, antistatic agents other than carbon black are sometimes employed in the form of electrically conductive powders such as graphite, denatured graphite, carbon black graft polymer, tin oxide-antimony oxide, tin oxide and titanium oxide-tin oxide-antimony oxide; natural surfactants such as saponin; nonionic surfactants such as alkylene oxides, glycerin, glycidol, polyhydric alcohols, polyhydric alcohol esters and alkyl phenol EO adducts; cationic surfactants such as higher alkylamines, cyclic amines, hydantoin derivatives, amidoamines, esteramides, quaternary ammonium salts, pyridine and other heterocycles, phosphoniums and sulfoniums; anionic surfactants comprising acid group such as carboxylic acid, sulfonic acid, phosphonic acid, phosphoric acid, sulfuric acid ester groups, phosphonic acid esters and phosphoric acid ester groups; amino acids; aminosulfonic acids, sulfuric acid and phosphoric acid esters of amino alcohols, amphoteric surfactants such as alkyl betaine. These surfactants may be added singly or in combination. These surfactants are preferably added in the magnetic recording medium in a proportion falling within a range of 0.01 to 10 mass parts per 100 mass parts of ferromagnetic powder. Although these are employed as antistatic agents, they may in some cases also be employed for other purposes, for example, to improve dispersion and magnetic characteristics, improve lubrication, as coating assistants, moistening agents, curing promoters, and to promote dispersion.

All or some of the additives used in the present invention may be added at any stage in the process of manufacturing the magnetic layer coating liquid. For example, they may be mixed with the ferromagnetic powder before a kneading step; added during a step of kneading the ferromagnetic powder, the binder, and the solvent; added during a dispersing step; added after dispersing; or added immediately before coating. Part or all of the additives may be applied by simultaneous or sequential coating after the magnetic layer has been applied to achieve a specific purpose. Depending on the objective, the lubricant may be coated on the surface of the magnetic layer after calendering or making slits.

<Organic Solvents>

The organic solvent employed in the present invention may be used in any ratio. Examples are ketones such as acetone, methyl ethyl ketone, methyl isobutyl ketone, diusobutyl ketone, cyclohexanone, isophorone, and tetrahydrofuran; alcohols such as methanol, ethanol, propanol, butanol, isobutyl alcohol, isopropyl alcohol, and methylcyclohexanol; esters such as methyl acetate, butyl acetate, isobutyl acetate, isopropyl acetate, ethyl lactate, and glycol acetate; glycol ethers such as glycol dimethyl ether, glycol monoethyl ether, and dioxane; aromatic hydrocarbons such as benzene, toluene, xylene, cresol, and chlorobenzene; chlorinated hydrocarbons such as methylene chloride, ethylene chloride, carbon tetrachloride, chloroform, ethylene chlorohydrin, and dichlorobenzene; N,N-dimethylformamide; and hexane.

These organic solvents need not be 100 percent pure and may contain impurities such as isomers, unreacted materials, by-products, decomposition products, oxides and moisture in addition to the main components. The content of these impurities is preferably equal to or less than 30 percent, more preferably equal to or less than 10 percent. Preferably the same type of organic solvent is employed in the present invention in the magnetic layer and in the nonmagnetic layer. However, the amount added may be varied. The stability of coating is increased by using a solvent with a high surface tension (such as cyclohexanone or dioxane) in the nonmagnetic layer. Specifically, it is important that the arithmetic mean value of the magnetic layer solvent composition be not less than the arithmetic mean value of the nonmagnetic layer solvent composition. To improve dispersion properties, a solvent having a somewhat strong polarity is desirable. It is desirable that solvents having a dielectric constant equal to or higher than 15 are comprised equal to or higher than 50 percent of the solvent composition. Further, the dissolution parameter is desirably 8 to 11.

<Characteristics of Magnetic Layer>

In the present invention, separate magnetic layers having different magnetic characteristics may be employed. Known techniques for multilayered magnetic layer can be applied.

A magnetic layer surface roughness, as a 10 $\mu$m PSD, is preferably equal to or less than 9,000 nm$^3$, more preferably equal to or less than 7,000 nm$^3$, further preferably equal to or less than 5,000 nm$^3$. A 10 $\mu$m PSD equal to or less than 9,000 nm$^3$ is desirable in that electromagnetic characteristics are not compromised during recording or reproduction and adequate electromagnetic characteristics can be ensured during reproduction with MR heads.

In the present specification, the 10 $\mu$m PSD refers to a frequency-distributed intensity of 100/mm of the surface roughness of an area of 250 $\mu$m×250 $\mu$m measured with a noncontact surface roughness meter TOP03D made by WYKO.

Further, the centerline surface roughness Ra of the magnetic layer (cutoff value 0.25 mm) is desirably 1 to 10 nm, and can be suitably set based on the objective. To improve electromagnetic characteristics, the lower the centerline surface roughness Ra the better. By contrast, the higher the value the better for achieving good running durability. The root means square (RMS) surface roughness RRMS obtained by evaluation by atomic force microscope (AFM) desirably ranges from 2 to 15 nm.

The residual solvent in all magnetic layer is preferably equal to or less than 100 mg/m$^2$ and more preferably equal to or less than 10 mg/m$^2$. The void ratio in the magnetic layer is preferably equal to or less than 30 volume percent, more preferably equal to or less than 20 volume percent. Although a low void ratio is preferable for attaining high output, there are some cases in which it is better to ensure a certain level based on the object. For example, in many cases, larger void ratio permits preferred running durability in disk media in which repeat use is important. The Switching Field Distribution (SFD) of the magnetic layer is preferably equal to or less than 0.6.

The modulus of elasticity at 0.5 percent extension of the magnetic layer desirably ranges from 0.98 to 19.6 GPa (100 to 2,000 kg/mm$^2$) in each in-plane direction. The breaking strength desirably ranges from 9.8 to 294 MPa (1 to 30 kg/mm$^2$). The modulus of elasticity of the magnetic recording medium desirably ranges from 0.98 to 14.7 GPa (100 to 1,500 kg/mm$^2$) in each in-plane direction (in the running direction and the longitudinal direction for magnetic recording tapes). The residual elongation is desirably equal to or less than 0.5 percent, and the thermal shrinkage rate at all temperatures below 100° C. is preferably equal to or less than 1 percent, more preferably equal to or less than 0.5 percent, and most preferably equal to or less than 0.1 percent.

The glass transition temperature (i.e., the temperature at which the loss elastic modulus of dynamic viscoelasticity peaks as measured at 110 Hz) of the magnetic layer is preferably 50 to 120° C. The loss elastic modulus preferably falls within a range of 10 to 800 MPa ($1 \times 10^8$ to $8 \times 10^9$ dyne/cm$^2$) and the loss tangent is preferably equal to or less than 0.2. Adhesion failure tends to occur when the loss tangent becomes excessively large. These thermal characteristics and mechanical characteristics are desirably nearly identical, varying by 10 percent or less, in each in-plane direction of the medium. The coefficient of friction to the magnetic layer surface (and SUS420J of the reverse side thereof) at a temperature of −10 to 40° C. and a humidity ranging from 0 to 95 percent is normally equal to or less than 0.5, preferably equal to or less than 0.3 percent. The specific surface resistivity of the magnetic layer is desirably $10^4$ to $10^{12}$ Ω/sq on the magnetic plane, and the charge potential is desirably −500 to 500 V.

[Nonmagnetic Layer]

The nonmagnetic layer in the present invention comprises a binder and a nonmagnetic powder. Details about the binder and the other additives are as described for the magnetic layer above.

The nonmagnetic powder employed in the nonmagnetic layer of the magnetic recording tape of the present invention can be suitably selected from inorganic compounds such as metal oxides, metal carbonates, metal sulfates, metal nitrides, metal carbides, metal sulfides and the like. Examples of inorganic compounds are α-alumina having an α-conversion rate equal to or higher than 90 percent, β-alumina, γ-alumina, silicon carbide, chromium oxide, cerium oxide, α-iron oxide, corundum, silicon nitride, titanium carbide, titanium dioxide, silicon dioxide, tin oxide, magnesium oxide, tungsten oxide, zirconium oxide, boron nitride, zinc oxide, calcium carbonate, calcium sulfate, barium sulfate, and molybdenum disulfide; these may be employed singly or in combination. Particularly desirable are titanium dioxide, zinc oxide, iron oxide and barium sulfate. Even more preferred are titanium dioxide and α-iron oxide. The particle size of these nonmagnetic powders preferably ranges from 0.005 to 2 μm, but nonmagnetic powders of differing particle size may be combined as needed, or the particle diameter distribution of a single nonmagnetic powder may be broadened to achieve the same effect. What is preferred most is 0.01 to 0.2 μm. The shape of the nonmagnetic powder may be any of acicular, spindle-shaped, granular, or plate-shaped, with acicular and spindle-shaped being particular preferred.

The tap density ranges from 0.05 to 2 g/ml, preferably from 0.2 to 1.5 g/ml. The moisture content ranges from 0.1 to 5 mass percent, preferably from 0.2 to 3 mass percent. The pH ranges from 2 to 11, and the pH between 6 to 9 is particular preferred. The specific surface area ranges from 1 to 100 m$^2$/g, preferably from 5 to 80 m$^2$/g, further preferably from 7 to 40 m$^2$/g. The crystallite size preferably ranges from 0.01 to 2 μm. The oil absorption capacity using dibutyl phthalate (DBP) ranges from 5 to 100 ml/100 g, preferably from 10 to 80 ml/g, further preferably from 20 to 60 ml/100 g. The specific gravity ranges from 1 to 12, preferably from 3 to 6. The shape may be any of acicular, spherical, polyhedral, or plate-shaped. The ignition loss is desirably equal to or less than 20 mass percent. The Mohs' hardness of the above-mentioned nonmagnetic powder employed in the present invention is preferably equal to or higher than 4. The roughness factor of the powder surface preferably ranges from 0.8 to 1.5, more preferably from 0.9 to 1.2. The stearic acid (SA) adsorption capacity ranges from 1 to 20 μmol/m$^2$, preferably from 2 to 15 μmol/m$^2$. The heat of wetting in 25° C. water of the lower layer nonmagnetic powder is preferably within the range of 200 to 600 nJ/cm$^2$ (200 to 600 erg/cm$^2$). A solvent with a heat of wetting within this range may also be employed. The quantity of water molecules on the surface at 100 to 400° C. suitably ranges from 1 to 10 pieces per 100 Angstroms. The pH of the isoelectric point in water preferably ranges from 3 to 6.

At least a portion of the surface of these powders is preferably coated with $Al_2O_3$, $SiO_2$, $TiO_2$, $ZrO_2$, $SnO_2$, $Sb_2O_3$, and ZnO. The coating compounds of preference with regard to dispersibility are $Al_2O_3$, $SiO_2$, $TiO_2$, and $ZrO_2$, and $Al_2O_3$, $SiO_2$ and $ZrO_2$ are further preferable. The combination of $Al_2O_3$ and $SiO_2$ are preferred for use. In this case, the coating structure which comprises a first alumina coating and a second silica coating thereover or the reverse structure thereof may be adopted. Simultaneous coating with two kinds of compounds may also be conducted. Depending on the objective, the surface layer with the above-mentioned coating compounds may be a porous layer, with homogeneity and density being generally desirable.

Specific examples of nonmagnetic powders are: UA5600 and UA5605 from Showa Denko K. K.; AKP-20, AKP-30, AKP-50, HIT-55, HIT-100 and ZA-G1 from Sumitomo Chemical Co., Ltd.; G5, G7 and S-1 from Nippon Chemical industrial Co., Ltd.; TF-100, TF-120, TF-140 and R516 from Toda Kogyo Corp.; TTO-51B, TTO-55A, TTO-55B, TTO-55C, TTO-55S, TTO-55D, FT-1000, FT-2000, FTL-100, FTL-200, M-1, S-1, SN-100, R-820, R-830, R-930, R-550, CR-50, CR-80, R-680 and TY-50 from Ishihara Sangyo Co., Ltd.; ECT-52, STT-4D, STT-30D, STT-30 and STT-65C from Titan Kogyo K. K.; T-1 from Mitsubishi Materials Corporation; NS-O, NS-3Y and NS-8Y from Nippon Shokubai Co., Ltd.; MT-100S, MT-100T, MT-150W, MT-500B, MT-600B and MT-100F from Tayca Corporation; FINEX-25, BF-1, BF-10, BF-20, BF-1L and BF-10P from Sakai Chemical Industry Co., Ltd.; DEFIC-Y and DEFIC-R from Dowa Mining Co., Ltd.; Y-LOP from Titan Kogyo K. K.; and sintered products of the same. Particular preferable nonmagnetic powders are titanium dioxide.

α-iron oxide is an another example of the nonmagnetic powder that can be employed in the nonmagnetic layer. α-iron oxide may be selected that is either acicular or spindle-shaped, having an average major axis length of 0.05 to 0.3 μm, preferably 0.06 to 0.15 μm, an acicular ratio of 2 to 20, preferably 3 to 10, and a pH of 7 to 11, preferably 8 to 11, and most preferably 9 to 10. α-iron oxide having a pH in this range may be obtained by regulating the pH in the step of neutralizing the alkali such as sodium hydroxide or sodium carbonate employed in the preparation of α-iron oxide, or by adjusting the extent of washing with water of the alkali or the like. Employing α-iron oxide the surface of at least a portion of which has been coated with at least one compound selected from among $Al_2O_3$, $SiO_2$, or $ZrO_2$ is desirable in that storage properties at high temperature and humidity improve markedly. Further, surface treatment with organic compounds having acid groups derived from oxygen acids of phosphorus, such as phenyl phosphonic acid (for example, the compounds given by general formulas (1) through (3) in U.S. Pat. No. 5,318,838) can be employed to markedly improve storage properties at high temperature and humidity.

Mixing carbon black into the nonmagnetic layer achieves the known effects of lowering Rs. Examples of types of carbon black that are suitable for use are furnace black for rubber, thermal for rubber, black for coloring and acetylene black. The specific surface area ranges from 100 to 500 m$^2$/g, preferably from 150 to 400 m$^2$/g and the DBP oil absorption capacity ranges from 20 to 400 ml/100 g, preferably from 30 to 200 ml/100 g. The particle diameter ranges from 5 to 80 mμ, preferably from 10 to 50 mμ, further preferably from 10 to 40 mμ. It is preferable for carbon black that the pH ranges from 2 to 10, the moisture content ranges from 0.1 to 10 percent and the tap density ranges from 0.1 to 1 g/ml. Specific examples of types of carbon black suitable for use in the present invention are: BLACK PEARLS 2000, 1300, 1000, 900, 800, 880, 880, 700 and VULCAN XC-72 from Cabot Corporation; #3050B, 3150B, 3250B, #3750B, #3950B, #950, #650B, #970B, #850B and MA-600 from Mitsubishi Chemical Corporation; CONDUCTEX SC, RAVEN 8800, 8000, 7000, 5750, 5250, 3500, 2100, 2000, 1800, 1500, 1255 and 1250 from Columbia Carbon Co., Ltd.; and Ketjen Black EC from Lion Akzo Co., Ltd.

The carbon black employed in the nonmagnetic layer can be surface treated with a dispersing agent or the like, grafted with a resin, or a portion of the surface may be graphite-treated. Further, the carbon black may be dispersed with a binder prior to being added to the coating material. These types of carbon black are employed in a range that does not exceed 50 mass percent with respect to the inorganic powder above and does not exceed 40 percent with respect to the total mass of the nonmagnetic layer. These types of carbon black may be employed singly or in combination. The *Carbon Black Handbook* compiled by the Carbon Black Association may be consulted for types of carbon black suitable for use in the present invention.

[Flexible Nonmagnetic Support]

Nonmagnetic and flexible supports are preferred in the magnetic recording medium of the present invention. The supports suitable for use are known films such as polyesters such as polyethylene terephthalate and polyethylene naphthalate, polyolefins, cellulose triacetate, polycarbonates, polyamides, polyimides, polyamidoimides, polysulfones, aramides and aromatic polyamides. Supports made of polyethylene nephthalate, polyamide (aromatic polyamide and aramide), and polyimide are particularly preferred.

These supports may be subjected beforehand to corona discharge treatment, plasma treatment, adhesion-enhancing treatment, heat treatment, dust removal, or the like.

In tapes, the flexible nonmagnetic support employed in the present invention has a Young's modulus in the MD direction ranging from 3.92 to 14.7 GPa (400 to 1,500 kg/mm$^2$), preferably from 4.9 to 12.74 GPa (500 to 1,300 kg/mm$^2$), a Young's modulus in the TD direction ranging from 4.9 to 19.6 GPa (500 to 2,000 kg/mm$^2$), preferably from 6.86 to 17.64 GPa (700 to 1,800 kg/mm$^2$). The TD/MD ratio ranges from 1/1 to 1/5, preferably from 1/1 to 1/3.

The flexible nonmagnetic support preferably has a thermal shrinkage rate after 30 minutes at 100° C. in the tape running and width directions equal to or less than 3 percent, more preferably equal to or less than 1.5 percent, a thermal shrinkage rate after 30 minutes at 80° C. equal to or less than 1 percent, more preferably equal to or less than 0.5 percent. The breaking strength in both directions preferably ranges from 0.049 to 0.98 GPa (5 to 100 kg/mm$^2$).

[Layer Structure]

Details about the structure and the thickness of the magnetic layer in the magnetic recording medium of the present invention are as described above. Therefore, details about the thickness of the flexible nonmagnetic support and the nonmagnetic layer will be described below.

The thickness of the flexible nonmagnetic support in the present invention normally can range from 1 to 100 µm, preferably from 3 to 80 µm. An undercoating layer for improving adhesion between the flexible nonmagnetic support and the nonmagnetic layer may be provided. When the undercoating layer is provided, the thickness of the undercoating layer ranges from 0.1 to 2 µm, preferably from 0.02 to 0.5 µm. A backcoat layer may be provided on the opposite side from the side on which the magnetic layer is provided on the flexible nonmagnetic support. In this case, the thickness of the backcoat layer ranges from 0.1 to 2 µm, preferably from 0.3 to 1.0 µm. Known undercoating layers and backcoat layers may be employed.

The thickness of the nonmagnetic layer is normally 0.5 to 3.0 µm, preferably 0.7 to 2.0 µm, and more preferably 1.0 to 2.0 µm.

So long as the nonmagnetic layer in the present invention functions as a substantially nonmagnetic layer, it is applicable as a nonmagnetic layer in the present invention if small quantities of magnetic material may be contained therein as impurities or intendedly. What is meant by "substantially nonmagnetic layer" is a lower layer exhibiting a residual magnetic flux density equal to or less than 50 T·m (500 Gauss) or a coercive force (Hc) equal to or less than about 40 percent of that of the magnetic layer, with the residual magnetic flux and coercive force preferably being zero.

The magnetic recording medium of the present invention comprises a nonmagnetic layer and the magnetic layer. It will be readily deduced that the physical properties of the nonmagnetic layer and magnetic layer may be varied based on the objective. For example, the modulus of elasticity of the magnetic layer may be increased to improve running durability while simultaneously employing a lower modulus of elasticity than that of the magnetic layer in the nonmagnetic layer to improve the head contact of the magnetic recording medium.

Known techniques relating to multilayered magnetic layers may be consulted with respect to what physical characteristics to impart to the various magnetic layers when there are two or more layers. For example, there are a lot of prior arts on making the coercive force (Hc) of the upper magnetic layer higher than the coercive force (Hc) of the lower magnetic layer, such as Japanese Examined Patent Publications (KOKOKU) Showa No. 37-2218 and Japanese Unexamined Patent Publication (KOKAI) Showa No. 58-56228. It is possible to record on magnetic layers even with higher coercive force (Hc) by employing a thin magnetic layer as in the present invention.

[Manufacture of Magnetic Recording Medium]

The process for manufacturing the coating material for magnetic layer or nonmagnetic layer of the magnetic recording medium of the present invention comprises at least a kneading step, a dispersing step, and a mixing step to be carried out, if necessary, before and/or after the kneading and dispersing steps. Each of the individual steps may be divided into two or more stages. All of the starting materials employed in the present invention, including the ferromagnetic powder, nonmagnetic powder, binders, carbon black, abrasives, antistatic agents, lubricants, solvents, and the like, may be added at the beginning of, or during, any of the steps. Moreover, the individual starting materials may be divided up and added during two or more steps. For example, polyurethane may be divided up and added in the kneading step, the dispersion step, and the mixing step for viscosity adjustment after dispersion.

To achieve the object of the present invention, conventionally known manufacturing techniques may be utilized for some of the steps. High residual magnetic flux density (Br) can be achieved in the magnetic recording medium of the present invention only by employing a kneader having a strong kneading force, such as a continuous kneader or pressure kneader in the kneading step. When a continuous kneader or pressure kneader is employed, the ferromagnetic powder and all or part of the binder (preferably equal to or higher than 30 percent of the entire quantity of binder) are kneaded in a range of 15 to 500 mass parts per 100 mass parts of ferromagnetic powder. Details of the kneading process are described in Japanese Unexamined Patent Publication (KOKAI) Heisei No. 1-106338 and Japanese Unexamined Patent Publication (KOKAI) Showa No. 64-79274. Further, a dispersing medium with a high specific gravity is desirably employed in the preparation of the nonmagnetic layer coating liquid, and zirconia beads being suitable for use.

Methods such as the following are desirably employed when coating a multilayer-structured magnetic recording medium in the present invention;

(1) A method in which the nonmagnetic layer is first applied with a coating device commonly employed to apply magnetic coating materials such as a gravure coating, roll coating, blade coating, or extrusion coating device, and the magnetic layer is applied while the lower layer is still wet by means of a support pressure extrusion coating device such as is disclosed in Japanese Examined Patent Publication (KOKOKU) Heisei No. 1-46186 and Japanese Unexamined Patent Publication (KOKAI) Showa No. 60-238179 and Japanese Unexamined Patent Publication (KOKAI) Heisei No. 2-265672;

(2) A method in which the magnetic and nonmagnetic layers are applied nearly simultaneously by a single coating head having two built-in slits for passing coating liquid, such as is disclosed in Japanese Unexamined Patent Publication (KOKAI) Showa No. 63-88080, Japanese Unexamined Patent Publication (KOYIA) Heisei No. 2-17971, and Japanese Unexamined Patent Publication (KOKAI) Heisei No. 2-265672; and (3) A method in which the magnetic and nonmagnetic layers are applied nearly simultaneously using an extrusion coating apparatus with a backup roller as disclosed in Japanese Unexamined Patent Publication (KOKAI) Heisei No. 2-174965.

To avoid compromising the electromagnetic characteristics or the like of the magnetic recording medium by aggregation of magnetic particles, shear is desirably imparted to the coating liquid in the coating head by a method such as disclosed in Japanese Unexamined Patent Publication (KOKAI) Showa No 62-95174 or Japanese Unexamined Patent Publication (KOKAI) Heisei No. 1-236968. In addition, the viscosity of the coating liquid must satisfy the numerical range specified in Japanese Unexamined Patent Publication (KOKAI) Heisei No. 3-8471. Strong orientation is required to achieve the magnetic recording medium of the present invention. A 100 T·m (1,000 G) or greater solenoid and a 200 T·m (2,000 G) or greater cobalt magnet are desirably employed together with like poles opposed. To maximize orientation following drying, a suitable preliminary drying step is desirably provided before orientation. Further, when applying the present invention to a disk medium, an orientation method for randomizing the orientation is necessary.

Processing may be conducted with calender rolls in the form of heat-resistant plastic rolls such as epoxy, polyimide, polyamide, and polyimidoamide. Metal rolls may be employed for calendering. The processing temperature is preferably equal to or higher than 70° C., more preferably equal to or higher than 80° C. The linear pressure is desirably equal to or higher than 200 kg/cm, more preferably equal to or higher than 300 kg/cm.

When the magnetic recording medium of the present invention is a magnetic recording tape, it has magnetic characteristics such that when measured at a magnetic field of 398 kA/m (5 kOe), squareness in the tape running direction is equal to or higher than 0.70, preferably equal to or higher than 0.75, and more preferably, equal to or higher than 0.85. Further, squareness in the two directions perpendicular to the tape running direction is desirably equal to or less than 80 percent of the squareness in the running direction.

Embodiments

The present invention is described more specifically below through embodiments. The fact that the components, ratios, operations, sequences, and the like given therein may be varied without departing from the scope of the present invention will be readily understood by persons skilled in the art. Accordingly, the present invention should not be limited by the embodiments described below. Further, the "parts" given in the embodiments are mass parts unless specifically stated otherwise.

(Embodiment 1)
[Preparation of Magnetic Layer and Nonmagnetic Layer Coating Liquids]
(Components of Magnetic Layer Coating Liquid)
Plate-shaped hexagonal barium ferrite magnetic powder 100 parts
  Coercive force (Hc): 199 kA/m (2,500 Oe)
  Specific surface area by BET method: 65 m$^2$/g
  Surface treatment agent: Al$_2$O$_3$
  Particle size (plate diameter): 25 nm
  Plate ratio: 5
  Saturation magnetization ($\sigma$s): 58 A·m$^2$/kg (58 emu/g)
  pH: 8.2
  Ratio of particle present having a plate diameter of 10 nm or less: 6 percent

| | |
|---|---|
| Vinyl chloride copolymer | 5 parts |
| (MR-110 manufactured by Nippon Zeon Co., Ltd.) | |
| Polyester polyurethane resin | 3 parts |
| Neopentylglycol/caprolactone polyol/MDI | |
| (4,4'-diphenylmethane diisocyanate) = 0.9/2.6/1 | |
| -SO$_3$Na content: 1 × 10$^{-4}$ eq/g | |
| α-alumina (particle size: 0.1 μm) | 5 parts |
| Carbon black (particle size: 0.10 μm) | 0.5 parts |
| Butyl stearate | 1.5 parts |
| Stearic acid | 0.5 parts |
| Methyl ethyl ketone | 90 parts |
| Cyclohexanone | 30 parts |
| Toluene | 60 parts |

(Components of Nonmagnetic Layer Coating Liquid)

| | |
|---|---|
| Nonmagnetic powder α-Fe$_2$O$_3$ | 80 parts |
| Fe$_2$O$_3$ content: 90 percent or more | |
| Mean major axis length: 0.1 μm | |
| Acicular ratio: 8.5 | |
| Specific surface area by BET method: 56 m$^2$/g | |
| pH 8.0 | |
| DBP oil absorption capacity: 27 to 38 ml/100 g | |
| Surface treatment agent: Al$_2$O$_3$ | |
| Carbon black | 20 parts |
| Mean primary particle diameter: 16 nm (16 mμ) | |
| DBP oil absorption capacity: 80 ml/100 g | |
| pH 8.0 | |
| Specific surface area by BET method: 250 m$^2$/g | |
| Volatile content: 1.5 percent | |
| Vinyl chloride copolymer | 10 parts |
| MR-110 manufactured by Nippon Zeon Co., Ltd. | |
| Polyester polyurethane resin | 5 parts |
| Molecular weight: 35,000 | |
| Neopentylglycol/caprolactone polyol/MDI | |
| (4,4'-diphenylmethane diisocyanate) = 0.9/2.6/1 | |
| -SO$_3$Na content: 1 × 10$^{-4}$ eq/g | |
| Butyl stearate | 1 parts |
| Stearic acid | 1 parts |
| Methyl ethyl ketone | 100 parts |
| Cyclohexanone | 50 parts |
| Toluene | 50 parts |

Each components of the above-described magnetic layer coating liquid and nonmagnetic layer coating liquid was separately kneaded in a kneader and dispersed with a sand mill. Polyisocyanate was added to the dispersions obtained—three parts to the nonmagnetic layer coating liquid and one part to the magnetic layer coating liquid—after which 40 parts of a mixed solvent of methyl ethyl ketone and cyclohexanone were added to each. The mixtures were then passed through a filter having a 1 μm average pore diameter to prepare nonmagnetic layer and magnetic layer coating liquids. In this process, the solid component concentration of the magnetic layer coating liquid was adjusted higher than that of the nonmagnetic layer coating liquid, and the viscosity ratio was adjusted to equal to or less than 0.8.

Next, simultaneous multilayer coating was performed on a polyethylene terephthalate support 5.5 μm in thickness having MD and TD Young's moduli of 5.88 GPa (600 kg/mm$^2$) and 8.82 GPa (900 kg/mm$^2$), respectively, by applying the nonmagnetic coating liquid in a quantity designed to yield a dry thickness of 1.2 μm and immediately thereafter applying on the nonmagnetic layer the magnetic coating liquid in a quantity designed to yield a dry thickness of 0.05 μm. In this process, when being longitudinally oriented, the two layers were oriented in the longitudinal direction while still wet with cobalt magnets having like poles opposed and a magnetic force of 300 T·m (3,000 G) and a solenoid having a magnetic force of 150 T·m (1,500

G), and then dried. When being vertically oriented, the two layers were longitudinally oriented while still wet with the above-mentioned 300 T·m (3,000 G) cobalt magnets with like poles opposed, vertically oriented with a solenoid having a magnetic force of 150 T·m (1,500 G), and then dried. The product was then processed with a seven-stage calender comprised solely of metal rolls at a temperature of 90° C. and slit to a width of 8 mm to prepare an 8 mm videotape.

(Embodiment 2)

In Embodiment 2, the plate diameter of the barium ferrite in Embodiment 1 was changed to 35 nm, magnetic recording tape was prepared, and the magnetic recording tape was evaluated under the same conditions as in Embodiment 1. The results are given in Table 1.

(Embodiment 3)

In Embodiment 3, the thickness of the magnetic layer in Embodiment 1 was changed to 0.07 μm, magnetic recording tape was prepared, and the magnetic recording tape was evaluated under the same conditions as in Embodiment 1. The results are given in Table 1.

(Embodiment 4)

In Embodiment 4, the viscosity ratio of the magnetic layer coating liquid to the nonmagnetic layer coating liquid of Embodiment 1 was changed to 0.38, magnetic recording tape was prepared, and the magnetic recording tape was evaluated under the same conditions as in Embodiment 1. The results are given in Table 1.

(Embodiment 5)

In Embodiment 5, the thickness of the magnetic layer in Embodiment 1 was changed to 0.18 μm, magnetic recording tape was prepared, and the magnetic recording tape was evaluated under the same conditions as in Embodiment 1. The results are given in Table 1.

(Embodiment 6)

In Embodiment 6, the thickness of the magnetic layer in Embodiment 1 was changed to 0.09 μm, the viscosity ratio of the magnetic layer coating liquid to the nonmagnetic layer coating liquid was changed, magnetic recording tape was prepared, and the magnetic recording tape was evaluated under the same conditions as in Embodiment 1. The results are given in Table 1.

(Embodiment 7)

In Embodiment 7, the thickness of the magnetic layer in Embodiment 1 was changed to 0.07 μm, the barium ferrite plate diameter was changed to 15 nm, magnetic recording tape was prepared, and the magnetic recording tape was evaluated under the same conditions as in Embodiment 1. The results are given in Table 1.

COMPARATIVE EXAMPLE 1

In Comparative Example 1, magnetic recording tape was prepared employing metal magnetic material as ferromagnetic powder and evaluated under the same conditions as in Embodiment 1. The results are given in Table 1.

COMPARATIVE EXAMPLE 2

In Comparative Example 2, the barium ferrite plate diameter in Embodiment 1 was changed to 50 nm, the viscosity ratio of the magnetic layer coating liquid to the nonmagnetic coating liquid in Embodiment 1 was changed to 1.18, magnetic recording tape was produced without selection of the magnetic material by centrifugal separation, and the magnetic recording tape was evaluated under the same conditions as in Embodiment 1. The results are given in Table 2.

COMPARATIVE EXAMPLE 3

In Comparative Example 3, the viscosity ratio of the magnetic layer coating liquid to the nonmagnetic layer coating liquid in Embodiment 2 was changed to 1.18, magnetic recording tape was prepared without selection of the magnetic material by centrifugal separation, and the magnetic recording tape was evaluated under the same conditions as in Embodiment 2. The results are given in Table 2.

COMPARATIVE EMBODIMENT 4

In Comparative Example 4, the viscosity ratio of the magnetic layer coating liquid to the nonmagnetic coating liquid in Embodiment 2 was changed to 1.18, magnetic recording tape was prepared, and the magnetic recording tape was evaluated under the same conditions as in Embodiment 2. The results are given in Table 2.

COMPARATIVE EXAMPLE 5

In Comparative Example 5, the viscosity ratio of the magnetic layer coating liquid to the nonmagnetic layer coating liquid in Embodiment 1 was changed to 1.18, magnetic recording tape was prepared, and the magnetic recording tape was evaluated under the same conditions as in Embodiment 1. The results are given in Table 2.

[Evaluation Methods]

1. C/N Ratio

It was measured with a drum tester. A Bs 1.2 T MIG head with a gap length of 0.22 μm was employed as reproduction head, and a sealed MR head with a sealed gap of 0.2 μm and an MR film with a Bs of 1.2 T was employed in reproduction. The head-to-medium relative rate during both recording and reproduction was 10.5 m/sec. A single frequency signal of 21 MHz was recorded. The reproduction spectrum was observed with spectral analyzer made by Shibasoku. The C/N ratio was the ratio of 21 MHz carrier output to 19 MHz noise. The results are given in Tables 1 and 2.

2. Thickness

The sample tape was cut longitudinally to a thickness of about 0.1 μm with a diamond cutter and observed and photographed at 100,000-fold magnification with a transmission electron microscope. Lines were drawn on the magnetic layer surface and magnetic layer/nonmagnetic layer interface and measurements were conducted with an image processor IBAS2 (made by Zeiss). Over a measurement length of 21 cm, 85 to 300 measurements were conducted, and the average d and standard deviationσ were calculated. The results are given in Tables 1 and 2.

3. Volume of Magnetic Reversal

Measurement was conducted at magnetic field sweep times of 16 seconds and 160 seconds in the coercive force (Hc) measurement part with a vibrating sample magnetometer (made by Toei Kogyo). The volume of magnetic reversal was calculated from a relational equation:

$$Hc=(2K/Ms)\{1-[(kT/KV)ln(At/0.693)]^{1/2}\}$$

between the coercive force (Hc) due to thermal fluctuation and the volume of magnetic reversal. The results are given in Tables 1 and 2.

4. Surface Roughness

The Ra value was measured in a 250 nm×250 nm area by the MIRAU method with a TOP03D made by WYKO. In this process, spherical surface correction and cylindrical correction were conducted at a measurement wavelength of 650nm. The results are given in Tables 1 and 2.

5. Viscosity of Coating Liquid at High Shear Speed

The relation between shear speed and shear stress was measured with a Rotovisco made by Haake and the viscosity was calculated. The results are given in Tables 1 and 2.

6. Measurement of the Component [%] of Magnetic Reversal at 80 kA/m

The ratio of residual magnetic flux density to the increase in the magnetic field applied was cumulated with a vibrating sample magnetometer VSM-5 made by Toei Kogyo and the component equal to or less than 80 kA/m was calculated by integration from the curve of the cumulative magnetic reversal rate. The results are given in Tables 1 and 2.

TABLE 1

| | | Embodiment 1 | Embodiment 2 | Embodiment 3 | Embodiment 4 |
|---|---|---|---|---|---|
| Magnetic layer thickness [$\mu$m] | | 0.09 | 0.09 | 0.07 | 0.07 |
| Type of magnetic material | | BaFe | BaFe | BaFe | BaFe |
| Average plate diameter or major axis length [nm] | | 25 | 35 | 25 | 25 |
| Volume of magnetic reversal/volume of magnetic particles | | 2 | 1.4 | 2.3 | 1.7 |
| 10 $\mu$m PSD on the magnetic layer surface [nm$^3$] | | 7500 | 7000 | 8000 | 6000 |
| Viscosity at high shear speed [mPa · s] | Magnetic layer coating liquid | 9 | 9 | 9 | 5 |
| | Nonmagnetic layer coating liquid | 13 | 13 | 13 | 13 |
| | Magnetic layer coating liquid/ nonmagnetic layer coating liquid | 0.69 | 0.69 | 0.69 | 0.38 |
| Coating method | | W/W | W/W | W/W | W/W |
| Selection of magnetic material by centrifugal separation | | Done | Done | Done | Done |
| Content of components present with a plate diameter less than 10 $\mu$m [%] | | 7 | 4 | 7 | 7 |
| Coercive force Hc of magnetic layer [kA/m] | | 188 | 200 | 185 | 190 |
| Reversal components of 80 kA/m or less of the magnetic layer [%] | | 0.7 | 0.5 | 0.7 | 0.7 |
| Evaluation results | Reproduction output [dB] | 1.8 | 2.1 | 1.5 | 1.9 |
| | CNR[dB] | 6.1 | 4.9 | 5.1 | 6.4 |

| | | Embodiment 5 | Embodiment 6 | Embodiment 7 |
|---|---|---|---|---|
| Magnetic layer thickness [$\mu$m] | | 0.18 | 0.09 | 0.07 |
| Type of magnetic material | | BaFe | BaFe | BaFe |
| Average plate diameter or major axis length [nm] | | 25 | 25 | 15 |
| Volume of magnetic reversal/volume of magnetic particles | | 1.8 | 2.4 | 2.8 |
| 10 $\mu$m PSD on the magnetic layer surface [nm$^3$] | | 5800 | 8000 | 8400 |
| Viscosity at high shear speed [mPa · s] | Magnetic layer coating liquid | 9 | 10 | 9 |
| | Nonmagnetic layer coating liquid | 13 | 13 | 13 |
| | Magnetic layer coating liquid/ nonmagnetic layer coating liquid | 0.69 | 0.77 | 0.69 |
| Coating method | | W/W | W/W | W/W |
| Selection of magnetic material by centrifugal separation | | Done | Done | Done |
| Content of components present with a plate diameter less than 10 $\mu$m [%] | | 7 | 7 | 8.7 |
| Coercive force Hc of magnetic layer [kA/m] | | 188 | 186 | 184 |
| Reversal components of 80 kA/m or less of the magnetic layer [%] | | 0.7 | 0.7 | 0.9 |
| Evaluation results | Reproduction output [dB] | 3.2 | 1.4 | 1.1 |
| | CNR[dB] | 3.8 | 4.1 | 3 |

TABLE 2

|  | Comp.Ex.1 | Comp.Ex.2 | Comp.Ex.3 | Comp.Ex.4 | Comp.Ex.5 |
|---|---|---|---|---|---|
| Magnetic layer thickness [μm] | 0.1 | 0.1 | 0.1 | 0.1 | 0.1 |
| Type of magnetic material | Metal | BaFe | BaFe | BaFe | BaFe |
| Average plate diameter or major axis length [nm] | 100 | 50 | 35 | 35 | 25 |
| Volume of magnetic reversal/volume of magnetic particles | 3.2 | 3.2 | 3.5 | 3.5 | 2 |
| 10 μm PSD on the magnetic layer surface [nm³] | 10000 | 9000 | 9800 | 9700 | 12000 |
| Viscosity at high shear speed [mPa · s] Magnetic layer coating liquid | 13 | 13 | 13 | 13 | 13 |
| Nonmagnetic layer coating liquid | 13 | 11 | 11 | 11 | 11 |
| Magnetic layer coating liquid/nonmagnetic layer coating liquid | 1.00 | 1.18 | 1.18 | 1.18 | 1.18 |
| Coating method | W/W | W/W | W/W | W/W | W/W |
| Selection of magnetic material by centrifugal separation | — | None | None | Done | Done |
| Content of components present with a plate diameter less than 10 μm [%] | — | 9.8 | 12 | 4 | 7 |
| Coercive force Hc of magnetic layer [kA/m] | 192 | 134 | 198 | 200 | 140 |
| Reversal components of 80 kA/m or less of the magnetic layer [%] | 0.2 | 1.2 | 1.6 | 0.5 | 1.4 |
| Evaluation results Reproduction output [dB] | 0 | −0.8 | −1.5 | −1.3 | −2 |
| CNR[dB] | 0 | −0.3 | −0.9 | −0.7 | −2.2 |

Tables 1 and 2 indicate that reproduction output and the C/N ratio were both better when magnetic particles in the form of plate-shaped hexagonal ferrite (barium ferrite) were employed than when metal magnetic particles were employed (Embodiments 1 to 7 and Comparative Example 1). Further, when the average sizes (average plate diameters or major axis length) of the magnetic particles were both identical and the ratio of the volume of magnetic reversal to the volume of magnetic particles was equal to or less than 3, both reproduction output and the CNR were good (Embodiment 2 and Comparative Example 4). Further, when the average sizes of the magnetic particles (average plate diameter or major axis length) and the ratio of the volume of magnetic reversal to the volume of magnetic particles were both identical, better reproduction output and CNR were obtained when the coercive force Hc of the magnetic layer was equal to or higher than 159 kA/m (Embodiment 1 and Comparative Example 5). Still further, when the viscosity ratio of the magnetic layer coating liquid to the nonmagnetic layer coating liquid was equal to or less than 0.8 and the 10 μm PSD of the magnetic layer surface was equal to or less than 9,000 nm³, both reproduction output and the CNR were good.

Based on the present invention as set forth above, since stacking between plate-shaped hexagonal ferrite ferromagnetic particles and the surface roughness of the magnetic layer can be inhibited, it is possible to provide a magnetic recording medium optimized for use in high-density recording, particularly reproduction with MR heads, achieving high C/N ratios.

The present disclosure relates to the subject matter contained in Japanese Patent Application No. 2001-245918 filed on Aug. 14, 2001, which is expressly incorporated herein by reference in its entirety.

What is claimed is:

1. A magnetic recording medium comprising a nonmagnetic powder and a binder and a magnetic layer comprising a ferromagnetic powder and a binder in this order on a flexible nonmagnetic support, wherein the magnetic layer has an average thickness ranging from 0.02 to 0.2 μm, the ferromagnetic powder contained in the magnetic layer is a plate-shaped hexagonal ferrite ferromagnetic powder having an average plate diameter of 10 to 40 nm, the ratio of a volume of magnetic reversal to a volume of magnetic material particles is equal to or less than 3, the magnetic layer has a coercive force Hc equal to or higher than 159 kA/m, and components magnetically reversing in the magnetic field of 80 kA/m or less are less than 1 percent in the magnetization distribution of the magnetic layer.

2. The magnetic recording medium according to claim 1, wherein said magnetic layer has an average thickness ranging from 0.03 to 0.1 μm.

3. The magnetic recording medium according to claim 1, wherein said magnetic layer has an average thickness ranging from 0.03 to 0.08 μm.

4. The magnetic recording medium according to claim 1, wherein said plate-shaped hexagonal ferrite ferromagnetic powder has an average plate diameter of 10 to 35 nm.

5. The magnetic recording medium according to claim 1, wherein said plate-shaped hexagonal ferrite ferromagnetic powder has an average plate diameter of 15 to 35 nm.

6. The magnetic recording medium according to claim 1, wherein said ratio of a volume of magnetic reversal to a volume of magnetic material particles is equal to or less than 1.7.

7. The magnetic recording medium according to claim 1, wherein said ratio of a volume of magnetic reversal to a volume of magnetic material particles is equal to or less than 1.2.

8. The magnetic recording medium according to claim 1, wherein said magnetic layer has a coercive force Hc ranging from 159 to 400 kA/m.

9. The magnetic recording medium according to claim 1, wherein said components magnetically reversing in the magnetic field of 80 kA/m or less are equal to or less than 0.7 percent.

10. The magnetic recording medium according to claim 1, wherein said components magnetically reversing in the magnetic field of 80 kA/m or less are equal to or less than 0.5 percent.

11. The magnetic recording medium according to claim 1, wherein said magnetic recording medium has a 10 μm Power spectrum Density of Roughness equal to or less than 9,000 nm³ on the magnetic layer surface.

12. A method for use of the magnetic recording medium according to claim 1, wherein a MR head is employed during at least reproduction.

13. A method for use of the magnetic recording medium according to claim 1, wherein a MR head is employed during recording and reproduction.

* * * * *